US011549471B2

(12) United States Patent
Feld et al.

(10) Patent No.: US 11,549,471 B2
(45) Date of Patent: Jan. 10, 2023

(54) FILTER MUFFLER FOR AN EXHAUST GAS TURBOCHARGER OF AN INTERNAL COMBUSTION ENGINE

(71) Applicant: ABB Schweiz AG, Baden (CH)

(72) Inventors: Heinz-Jürgen Feld, Niederwil (CH); Marcel Joho, Auenstein (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/961,284

(22) PCT Filed: Jan. 4, 2019

(86) PCT No.: PCT/EP2019/050160
§ 371 (c)(1),
(2) Date: Jul. 10, 2020

(87) PCT Pub. No.: WO2019/137854
PCT Pub. Date: Jul. 18, 2019

(65) Prior Publication Data
US 2021/0071627 A1    Mar. 11, 2021

(30) Foreign Application Priority Data

Jan. 10, 2018 (DE) .......................... 102018100466.4

(51) Int. Cl.
*F02M 35/12*    (2006.01)
*F02B 37/00*    (2006.01)
*F04D 29/66*    (2006.01)

(52) U.S. Cl.
CPC .......... *F02M 35/1211* (2013.01); *F02B 37/00* (2013.01); *F02M 35/1288* (2013.01); *F04D 29/664* (2013.01)

(58) Field of Classification Search
CPC ........... F02M 35/1211; F02M 35/1288; F02M 35/12; F02M 35/1272; F02B 37/00; F04D 29/664
See application file for complete search history.

(56) References Cited

U.S. PATENT DOCUMENTS 2,953,900 A * 9/1960 Price .......................... F02C 7/00
                                                        60/264
3,372,862 A * 3/1968 Koenig, III ........... F04D 29/462
                                                        415/161
(Continued)

FOREIGN PATENT DOCUMENTS

CH         703087 A2    11/2011
CN         1136143 A    11/1996
(Continued)

OTHER PUBLICATIONS

German Patent Office, Search Report for related German Patent Application No. 10 2018 100 466.4, dated Sep. 28, 2018, 10 pages (including partial, machine translation).
(Continued)

*Primary Examiner* — Syed O Hasan
(74) *Attorney, Agent, or Firm* — Armstrong Teasdale LLP

(57) ABSTRACT

A filter muffler includes a front element, a rear element, and a plurality of damping elements arranged between the front element and the rear element, where the damping elements are arranged radially around a central axis of the filter muffler such that a flow channel is formed between adjacent damping elements, where respective outflow-side ends of the damping elements have a diffuser element which has an outflow-side tapering, and where an angle α between two opposite sides of the diffuser element is selected from a range of $1° \leq \alpha \leq 8°$.

20 Claims, 3 Drawing Sheets

(56) References Cited

U.S. PATENT DOCUMENTS

| | | | | |
|---|---|---|---|---|
| 4,667,769 A | * | 5/1987 | Appel | ............... F02M 35/1211 |
| | | | | 181/269 |
| 5,756,944 A | * | 5/1998 | Battig | .................. F04D 29/664 |
| | | | | 181/279 |
| 3,051,578 A1 | | 11/2011 | Kohlrusch | |
| 10,794,397 B2 | | 10/2020 | Sakamoto et al. | |
| 2009/0104024 A1 | * | 4/2009 | Kay | ..................... F04D 29/462 |
| | | | | 415/161 |
| 2014/0219781 A1 | | 8/2014 | Watson et al. | |

FOREIGN PATENT DOCUMENTS

| | | |
|---|---|---|
| CN | 101479424 A | 7/2009 |
| CN | 203500120 U | 3/2014 |
| CN | 104487694 A | 4/2015 |
| CN | 104870800 A | 8/2015 |
| CN | 107120314 A | 9/2017 |
| CN | 107250555 A | 10/2017 |
| CN | 206555042 U | 10/2017 |
| CN | 107407191 A | 11/2017 |
| CN | 212867744 U | 4/2021 |
| DE | 8505239 U1 | 8/1987 |
| DE | 10225092 A1 | 2/2003 |
| DE | 102010028763 A1 | 11/2011 |
| EP | 2868910 A1 | 5/2015 |
| EP | 2933470 A1 | 10/2015 |
| JP | S63123716 U | 5/1988 |
| JP | 2000130388 A | 5/2000 |
| JP | 2008215124 A | 9/2008 |
| JP | 2012117436 A | 6/2012 |
| JP | 2013160153 A | 8/2013 |
| JP | 2014118832 A | 6/2014 |
| JP | 2017150354 A | 8/2017 |

OTHER PUBLICATIONS

European Patent Office, International Search Report for related PCT Application No. PCT/EP2019/050160, dated May 15, 2019, 4 pages (including translation).

European Patent Office, Written Opinion of ISA for related PCT Application No. PCT/EP2019/050160, dated May 15, 2019, 10 pages (including translation).

Chinese Office Action and Search Report for Chinese Application No. 201980008149.5, dated Jul. 1, 2021, 9 pages.

JP Office Action dated Aug. 18, 2022 for a related application, JP application No. 2020-536106, 10 pages.

* cited by examiner

FILTER MUFFLER FOR AN EXHAUST GAS TURBOCHARGER OF AN INTERNAL COMBUSTION ENGINE

CROSS-REFERENCE TO RELATED APPLICATIONS

This application is a national stage entry under 35 U.S.C. § 371 of PCT International Application No. PCT/EP2019/050160, filed Jan. 4, 2019, which claims priority to German Patent Application No. 10 2018 100 466.4, filed Jan. 10, 2018. The entire disclosures of the foregoing applications are incorporated herein by reference.

TECHNICAL FIELD

The invention relates to the field of exhaust gas turbochargers for supercharged internal combustion engines. The invention relates in particular to a filter muffler for an internal combustion engine with an exhaust gas turbocharger. The invention furthermore relates to an internal combustion engine with a filter muffler as described in the present disclosure.

TECHNICAL BACKGROUND

Exhaust gas turbochargers are currently used as standard in order to improve the performance of an internal combustion engine, having a turbine in the exhaust system of the internal combustion engine and having a compressor arranged upstream of the internal combustion engine. The exhaust gasses of the internal combustion engine are expanded in the turbine here. The work obtained hereby is transmitted by means of a shaft to the compressor which compresses the air supplied to the internal combustion engine. As a result of the use of the energy of the exhaust gasses for compressing the air supplied to the combustion process in the internal combustion engine, the combustion process and the efficiency of the internal combustion engine can be optimized.

Sound waves with an undesirably high amplitude are typically primarily generated in the compressor wheel during operation of the exhaust gas turbocharger, which sound waves are released through the air intake duct to the surroundings. These sound waves are therefore normally damped by means of a filter muffler.

Filter mufflers are known from the prior art which are typically used on the intake side of a compressor which compresses the combustion air and supplies it to an internal combustion engine. Such a compressor is driven by the exhaust gas turbine of an exhaust gas turbocharger.

The filter mufflers are typically configured such that ambient air can be introduced through a filter arranged on the circumference of a filter muffler into an interior of the filter muffler equipped with damping elements, subsequently flows past the damping elements, and in this case to the compressor wheel, from which sound waves proceed counter to the flow of air, is deflected by guiding elements. Sound insulation is performed dissipatively at the damping elements in that the sound energy is converted directly into heat by porous or fibrous absorption materials, from which the damping elements are substantially constructed.

For example, patent application EP 0 740 080 A2 describes a filter muffler which is composed of a cast monoblock, and in the radiant ribs having grooves of which the damping elements are arranged. A filter frame, comprising a removable perforated plate part, surrounds the filter muffler in such a manner that the damping elements are secured against falling out radially. The perforated plate part is arranged annularly around the filter muffler by means of connecting elements. A disk-shaped damping element comprises four damping segments which together represent an annular surface. An absorption element is held by two punched perforated plates and thus forms a damping segment which is introduced radially into the grooves of the above-mentioned ribs of the cast monoblock.

It has been shown that optimal sound insulation can still not be achieved with the filter mufflers known from the prior art, in particular in the case of high flow speeds. It has furthermore been shown that the conventional filter mufflers have certain disadvantages in terms of the installation space size required and also in terms of the pressure losses which arise.

BRIEF DESCRIPTION OF THE INVENTION

The object of the present invention lies in providing a filter muffler which is improved at least in terms of one of the above-mentioned disadvantages of the filter mufflers known from the prior art. In particular, one object of the present invention lies in providing a filter muffler which has a more compact installation space size in comparison with the filter mufflers known from the prior art. A further object of the present invention lies in providing a filter muffler which has an improved design in order to reduce the pressure loss during flow through the filter muffler.

In order to achieve the above-mentioned object, a filter muffler according to the independent claims is provided. Further aspects, advantages and features of the present invention can be inferred from the dependent claims, the description and the attached figures.

According to an aspect of the invention, a filter muffler is provided which comprises a front element, a rear element, and a plurality of damping elements which are arranged between the front element and the rear element. The damping elements are arranged radially around a central axis of the filter muffler such that a flow channel is formed between adjacent damping elements. The respective outflow-side ends of the damping elements have a diffuser element which has an outflow-side tapering. An angle $\alpha$ between two opposite sides of the diffuser element, in particular of the outflow-side tapering, is selected from a range of $1° \leq \alpha \leq 8°$.

Accordingly, advantageously a filter muffler is provided which is improved in comparison with the filter mufflers known from the prior art. In particular, as a result of the filter muffler according to the invention, a filter muffler is provided which as a result of its design, in particular as a result of the design of the damping elements, is configured such that pressure losses can be reduced during flow through the filter muffler. A filter muffler with improved damping properties can thus be provided. The filter muffler according to the invention is furthermore advantageously configured such that it can be embodied to be more compact, in particular more compact in the axial direction, in comparison with conventional filter mufflers.

According to a further aspect of the invention, a filter muffler is provided which comprises a front element, a rear element, and a plurality of damping elements which are arranged between the front element and the rear element. The damping elements are arranged radially around a central axis of the filter muffler such that a flow channel is formed between adjacent damping elements. The respective outflow-side ends of the damping elements have a diffuser element having an outflow-side tapering.

An alternative solution for a filter muffler is thus advantageously provided which is improved in terms of its damping properties. In particular, a filter muffler is provided which as a result of its design, in particular as a result of the design of the damping elements, is configured such that pressure losses can be reduced during flow through the filter muffler.

According to a further aspect of the invention, an exhaust gas turbocharger having a filter muffler according to any of the embodiments described herein is provided, wherein the filter muffler is arranged on the intake side of a compressor of the exhaust gas turbocharger. An improved exhaust gas turbocharger can thus advantageously be provided.

According to a further aspect of the invention, an internal combustion engine having an exhaust gas turbocharger as described herein is provided such that an improved internal combustion engine can advantageously be provided.

BRIEF DESCRIPTION OF THE FIGURES

In the following, the invention is explained on the basis of exemplary embodiments represented in figures, from which exemplary embodiments further advantages and modifications arise. Here.

DETAILED DESCRIPTION OF THE FIGURES

Figure 1:
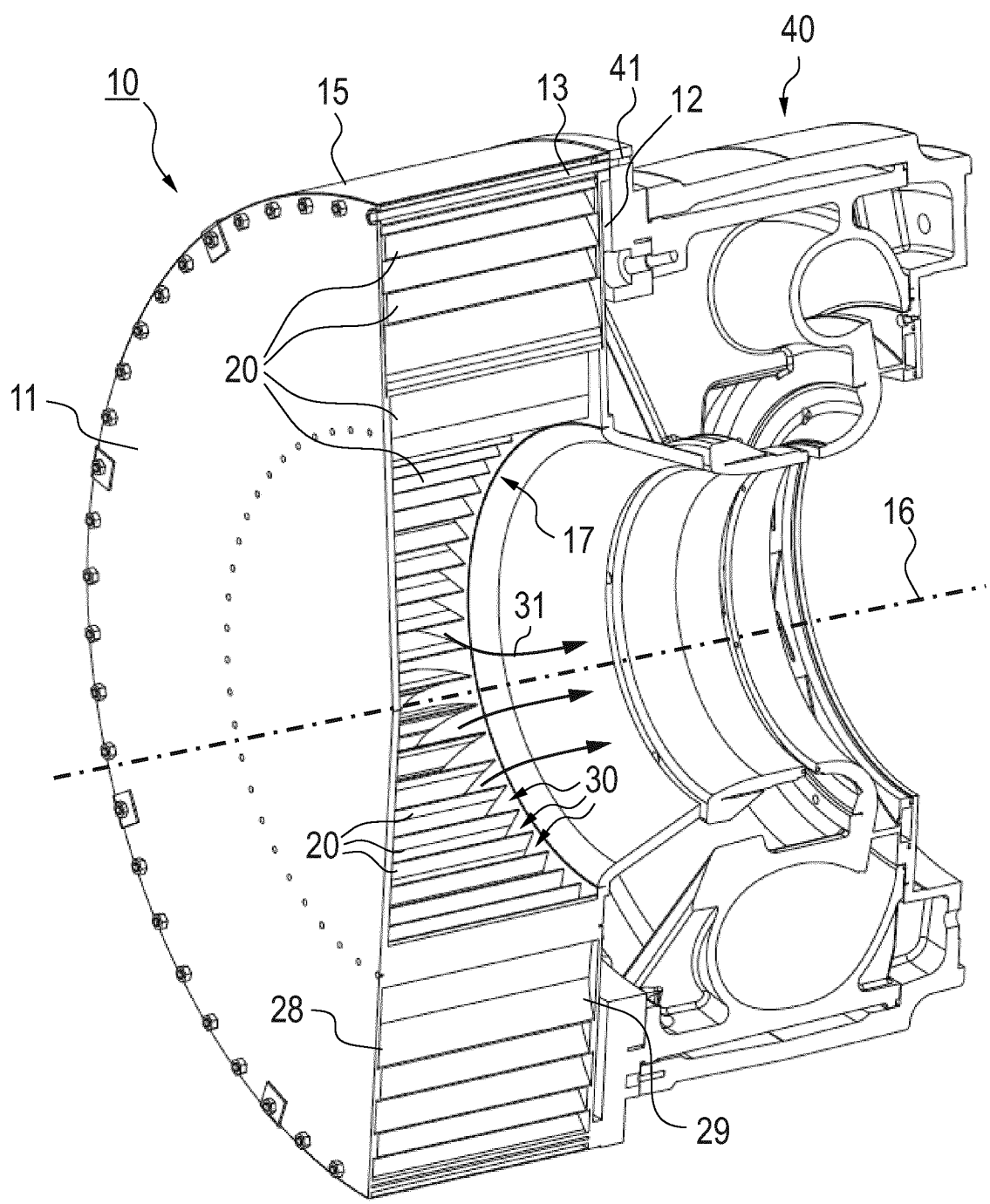
FIG. 1 shows a schematic perspective sectional view of a filter muffler according to embodiments described herein, wherein the filter muffler is arranged on an intake side of a compressor.

FIG. 1 shows a schematic perspective sectional view of a filter muffler 10 according to embodiments described herein. In particular, FIG. 1 shows a filter muffler 10 which is arranged on an intake side of a compressor 40. The represented filter muffler is configured to be cylindrical.

As is shown by way of example in FIG. 1, the filter muffler 10 according to the invention comprises a front element 11, a rear element 12, and a plurality of damping elements 20 which are arranged between the front element 11 and the rear element 12. The damping elements 20 are arranged radially around a central axis 16 of the filter muffler such that a flow channel 30 is formed between adjacent damping elements. As is shown by way of example in FIGS. 2 and 3, respective outflow-side ends 22 of the damping elements 20 have a diffuser element 23 which has an outflow-side tapering. An angle α between two opposite sides of the diffuser element, in particular of the outflow-side tapering, is selected from a range of $1° \leq \alpha \leq 8°$. Accordingly, the flow channel 30 can be formed between adjacent damping elements in such a manner that the flow channel 30 has, on the outflow side, an increasing flow cross-section. Thus, advantageously a filter muffler is provided with which pressure losses can be reduced.

Figure 2:
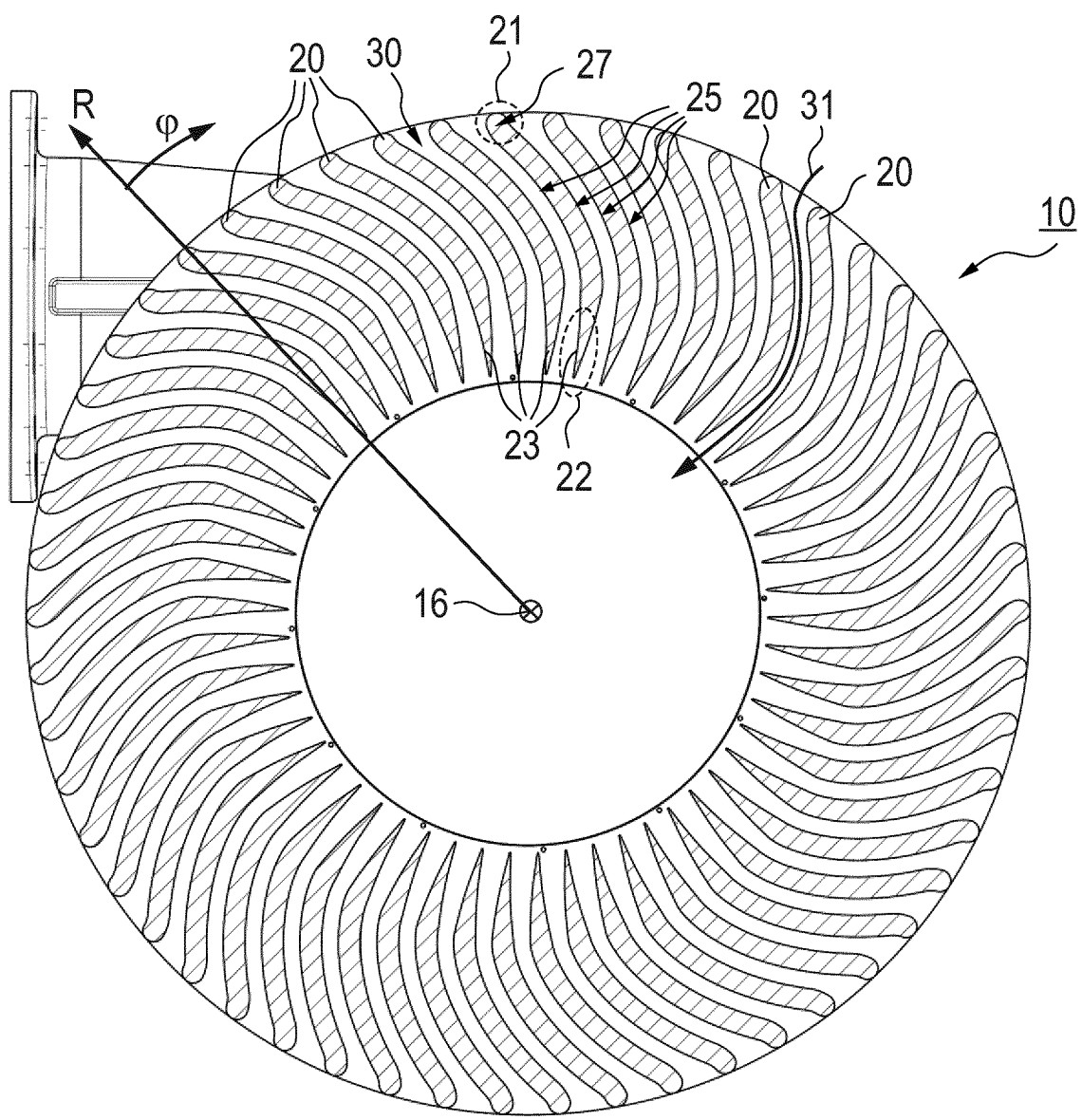
FIG. 2 shows a schematic axial sectional view of a filter muffler according to embodiments described herein.

In order to improve the damping properties of the filter muffler, in particular to reduce the pressure losses, according to an embodiment which can be combined with other embodiments described herein the flow channel 30 is delimited at least over 40% of the flow channel length by respective involute contours 25 of adjacent damping elements, as is represented by way of example in FIG. 2. The damping elements of the filter muffler described herein can also be referred to as splitters or baffles.

Figure 3:
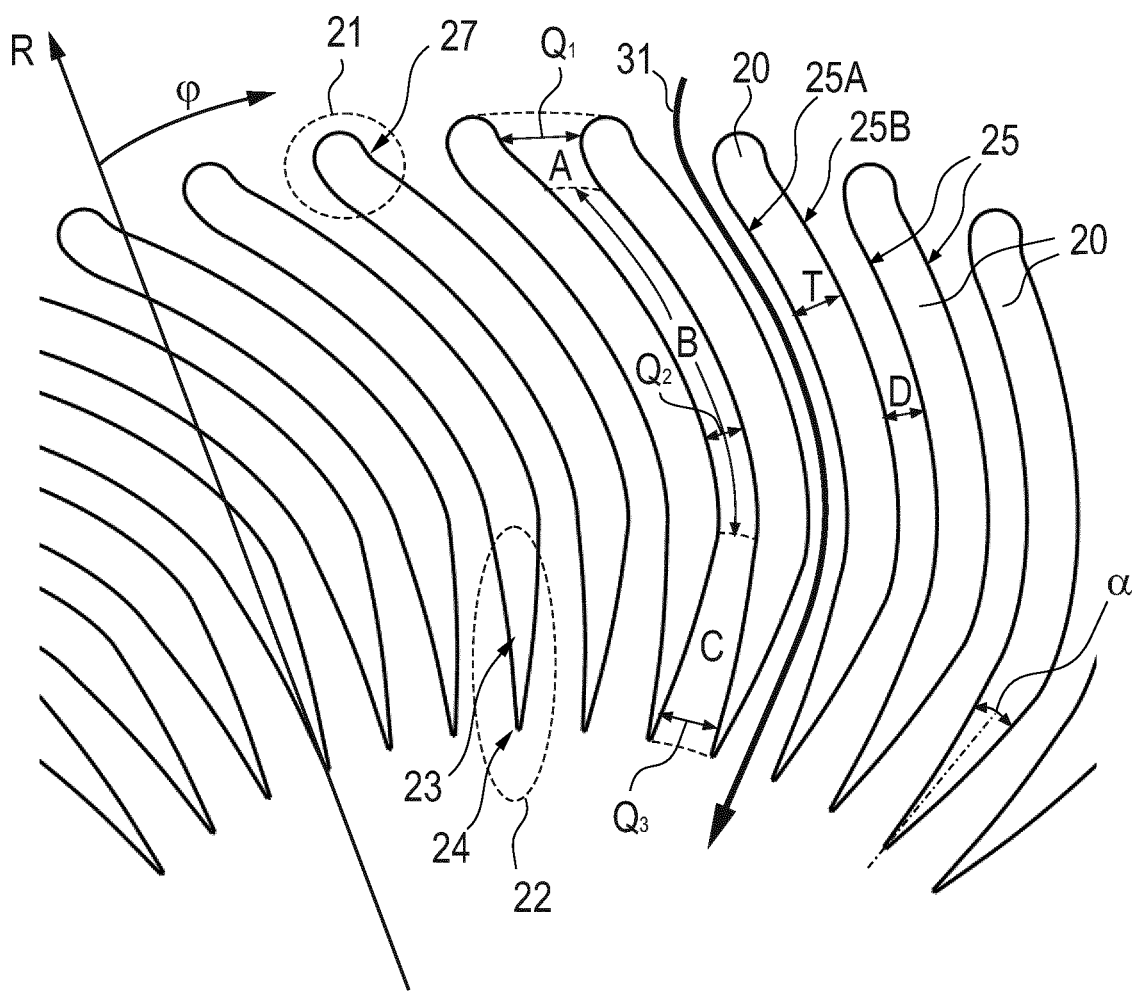
FIG. 3 shows an enlarged cut-out of the axial sectional view of the filter muffler from FIG. 2.

Alternatively or additionally, in order to improve the damping properties of the filter muffler, in particular to reduce the pressure losses, respective outflow-side ends 22 of damping elements 20 can have a diffuser element 23 which has an outflow-side tapering, as is represented by way of example in FIGS. 2 and 3.

A filter muffler can thus advantageously be provided which has curved flow channels (also referred to as splitter channels or baffle channels) which are configured such that the throughflow speed is as constant as possible and has no peak speeds. This is particularly advantageous because peak speeds have a quadratic effect on the pressure loss such that the filter muffler according to the invention has a reduced pressure loss. This has a positive effect on the damping properties and on the installation space of the filter muffler.

According to an embodiment which can be combined with other embodiments described herein, the flow channel 30 between adjacent damping elements is delimited at least over 50%, in particular at least over 65%, in particular at least over 70%, of the flow channel length by respective involute contours 25. As a result thereof, the through-flow of the filter muffler with constant flow speed can be further improved such that the damping characteristics of the filter muffler can be further improved.

The front element 11 can be a front plate. For example, the front plate can be formed in the form of a disk, in particular of a circular disk, as is represented by way of example in FIG. 1. The rear element 12 can be a rear plate, in particular a rear plate with a central opening 17 as an air-outlet opening. The rear plate can be formed in the form of a disk, in particular of a circular disk, with a central opening. For example, the rear plate can be configured annularly around the central opening 17, as is represented in FIG. 1. The direction of flow 31 from flow channels 30 formed between damping elements 20 through the air-outlet opening of the rear element into the compressor is indicated in FIG. 1 by arrows.

As is represented by way of example in FIGS. 1 and 2, the damping elements 20 are typically arranged evenly radially around the central axis 16 of the filter muffler such that a flow channel 30 which runs to central axis 16 is formed between adjacent damping elements. In particular, the respective flow channels between adjacent damping elements run from a radially outer inflow region of the filter muffler to a radially inner outflow region of the filter muffler.

As is represented by way of example in FIG. 1, a first end 28 of the respective damping elements is typically in contact with the front element 11 and a second end 29 of the respective damping elements is in contact with the rear element 12. For example, the damping elements 20 can be fixed by means of a connecting element 13 between the front element 11 and the rear element 12, as is represented by way of example in the upper part of FIG. 1. The connecting element typically connects the front element 11 to the rear element 12.

For example, the connecting element 13 can be screwed to the rear element 12. Alternatively, the connecting element can also be guided through a corresponding opening in the rear element 12 and screwed to a flange 41 of the compressor housing. The structure of the filter muffler is accordingly advantageously made more rigid by the axial connection, in particular axial screwing, of the front element 11 to the rear element 12 via connecting elements 13. The flange 41 can, for example, be part of an adapter ring attached to the compressor housing. The adapter ring is typically configured such that the filter muffler can be mounted thereon, for example, via connecting elements 13 described herein.

As is represented by way of example in FIG. 2, according to an embodiment which can be combined with other embodiments described herein, respective involute contours 25 of damping elements 20 are formed between a radially outer inflow-side end 21 and a radially inner outflow-side end 22 of the damping elements. The radial direction is marked by "R" in FIGS. 2 and 3.

According to an embodiment which can be combined with other embodiments described herein, respective inflow-side ends 21 of the damping elements 20 have, in relation to the respective involute contours, a rear curvature 27 in the circumferential direction. The term "rear curvature" should be understood such that the rear curvature has an opposite curvature in comparison with the curvature of the damping elements, as is represented in FIGS. 2 and 3. The circumferential direction is marked in FIGS. 2 and 3 by "φ". As a result of the rear curvature of the damping elements (also referred to as splitters or baffles), the inflow pressure loss can be advantageously reduced. Moreover, a radial inflow into the flow channels between the splitters can advantageously be achieved. The pressure loss at the inlet into the filter muffler can thus be reduced in particular also in that the flow speed is typically reduced by a filter plate 15 (also referred to as an inflow grid). Moreover, an obstruction in the inflow region can advantageously be reduced and/or the inflow speed can advantageously be reduced as a result of a rear curvature.

As is represented schematically in FIG. 1, the filter muffler according to an embodiment which can be combined with other embodiments described herein comprises a filter plate 15 in the inflow region of the filter muffler. The filter plate 15 is typically arranged on the circumference of the filter muffler. In particular, the filter plate 15 is advantageously connected in a force-locking manner to the front element 11 and the rear element 12, as a result of which the rigidity of the filter muffler can advantageously be increased. The filter plate is typically configured as a perforated plate, in particular as a perforated plate with hexagonal holes or openings. The filter plate typically has a free cross-section of approx. 80%. The thickness of the perforated plate can be, for example, 1 mm.

According to an embodiment which can be combined with other embodiments described herein, the respective outflow-side ends 22 of the damping elements 20 have a diffuser element 23. The diffuser elements 23 typically have an outflow-side tapering. As is apparent from FIG. 3, the tapering runs toward an outflow edge 24 of the diffuser element 23. In particular, the tapering can be configured such that the tapering at the outflow edge leads to a reduction in thickness of the damping element of at most 50% of thickness T of the damping elements in the intermediate region B, in particular at most 25% of thickness T of the damping elements in the intermediate region B, in particular at most 15% of thickness T of the damping elements in intermediate region B. In other words, thickness DDE of the diffuser elements 23 at the outflow edge can be $D_{DE} \leq 0.5 \times T$, in particular $D_{DE} \leq 0.25 \times T$, in particular $D_{DE} \leq 0.15 \times T$. An outflow pressure loss can thus advantageously be reduced. Furthermore, advantageously a stall at the outflow can substantially be avoided.

In other words, according to an embodiment which can be combined with other embodiments described herein, the damping elements 20 have at their end facing toward the central axis 16 (i.e. in the outflow region) a diffuser element 23, as is shown by way of example in FIGS. 2 and 3. For example, the respective diffuser elements 23 can be fastened by means of fastening elements to the front element 11 and/or the rear element 12. Non-detachable connections such as weld/solder or adhesive connections or also detachable connections, in particular screws, can be used as fastening elements.

As is apparent from FIGS. 1, 2 and 3, the diffuser elements 23 normally provide the splitter outlets. For example, the diffuser elements 23 can be milled from aluminum. The diffuser elements 23 are typically formed to be pointed, in particular triangular. The sides of the diffuser elements running to the tip are advantageously formed to be straight in order to enable hobbing or roll-milling. This enables easier and lower cost production.

According to an embodiment which can be combined with other embodiments described herein, an angle α between two opposite sides of diffuser element 23 is selected from a range of $1° \leq \alpha \leq 8°$. For the purpose of illustration, angle α between two opposite sides of a diffuser element 23 is represented in FIG. 3. For example, the angle can be $\alpha = 6° \pm 2°$, in particular $\alpha = 4° \pm 1°$.

According to an embodiment which can be combined with other embodiments described herein, the damping elements 20 are configured such that a cross-section Q1 of an inflow region A of the respective flow channels between adjacent damping elements 20 becomes smaller in direction of flow 31, as is represented by way of example in FIG. 3. The pressure loss at the inlet into the filter muffler can thus advantageously be reduced since flow inlet cross-section Q1 is increased in size in comparison with main flow cross-section Q2 between the splitters.

According to an embodiment which can be combined with other embodiments described herein, the damping elements 20 are configured such that a cross-section Q2 of the respective flow channels in a region which is delimited by involute contours 25 of adjacent damping elements is constant in direction of flow 31, as is represented by way of example in FIG. 3. The region which is delimited by involute contours 25 of adjacent damping elements represents the intermediate region B between the inflow region A and the outflow region C. The damping properties of the filter muffler can advantageously be improved by a constant distance of the splitters in the intermediate region B, as is represented, for example, in FIG. 3.

According to an embodiment which can be combined with other embodiments described herein, the damping elements 20 are configured such that a cross-section Q3 of an outflow region C of respective flow channels 30 between adjacent damping elements 20 becomes larger in direction of flow 31, as is shown by way of example in FIG. 3. This advantageously leads to a reduction in the outflow pressure loss. Furthermore, advantageously a stall can substantially be avoided.

According to an embodiment which can be combined with other embodiments described herein, a distance D between respective involute contours of adjacent damping elements 20 is selected from a range of $2\ mm \leq D \leq 30\ mm$, in particular $5\ mm \leq D \leq 25\ mm$, as is represented by way of example in FIG. 3.

As is represented by way of example in FIG. 3, according to an embodiment which can be combined with other embodiments described herein, respective damping elements 20 have a first involute contour 25A and a second involute contour 25B parallel thereto. For example, the first involute contour 25A can be concave and the second involute contour 25B can be convex, as is represented by way of example in FIG. 3. A distance T between the first involute contour 25A and the second involute contour 25b can be selected from a range of 6 mm≤T≤50 mm. The distance T thus corresponds to the thickness of the damping elements in the intermediate region B.

According to an embodiment which can be combined with other embodiments described herein, the damping elements comprise an absorption element which is typically composed of a damping material. For example, the damping material can be a foam material, a felt or a nonwoven, in particular a polyester nonwoven. The absorption element is typically surrounded at least partially by a damping plate. In particular, the damping plate can be formed such that a gap is formed between the side walls of a damping element. The absorption element can be accommodated in this gap.

According to an embodiment which can be combined with other embodiments described herein, the damping plate as described herein is a perforated plate with a thickness of 0.8 or 0.75 mm. The perforated plate can have, for example, holes with a diameter of 2 mm to 5 mm.

As is apparent from the embodiments described herein, a filter muffler is advantageously provided which is improved in comparison with the filter mufflers known from the prior art. In particular, as a result of the filter muffler according to the invention, a filter muffler is provided which enables a more compact installation space size, in particular in the axial direction. Moreover, the filter muffler according to the invention, as a result of its design, in particular as a result of the design of the damping elements or splitters, is advantageously configured in such a manner that pressure losses can be reduced when flowing through the filter muffler. A filter muffler with improved damping properties can thus be provided.

LIST OF REFERENCE NUMBERS

10 Filter muffler
11 Front element
12 Rear element
13 Connecting element
15 Filter plate
16 Central axis
17 Central opening
20 Damping element
21 Inflow-side end
22 Outflow-side end
23 Diffuser element
24 Outflow edge
25 Involute contour
25A First involute contour
25B Second involute contour
30 Flow channel
31 Direction of flow
40 Compressor
41 Flange of the compressor housing
A Inflow region
B Intermediate region
C Outflow region
D Distance D between adjacent damping elements
T Thickness of the damping elements
$Q_1$ Cross-section of the inflow region of the respective flow channels
$Q_2$ Cross-section of the intermediate region of the respective flow channels
$Q_3$ Cross-section of the outflow region of the respective flow channels
R Radial direction
φ Circumferential direction
α Angle between two opposite sides of the diffuser element

The invention claimed is:

1. A filter muffler arranged on an intake side of a compressor of an exhaust gas turbocharger for an internal combustion engine, the filter muffler comprising:
   a front element,
   a rear element, and
   a plurality of damping elements arranged between the front element and the rear element,
   wherein the damping elements are arranged radially around a central axis of the filter muffler such that a flow channel is formed between adjacent damping elements, wherein respective outflow-side ends of the damping elements have a diffuser element which has an outflow-side tapering toward the central axis, wherein the outflow-side tapering is continuous and meets to form the outflow-side ends, and wherein an angle α between two opposite sides of the diffuser element is selected from a range of 1°≤α≤8°.

2. The filter muffler of claim 1, wherein the flow channel has an increasing flow cross-section on the outflow side.

3. The filter muffler of claim 1, wherein the flow channel is delimited by respective involute contours of adjacent damping elements over at least 40% of the flow channel length.

4. The filter muffler of claim 3, wherein the respective involute contours of the damping elements are formed between a radially outer inflow-side end and a radially inner outflow-side end of the damping elements.

5. The filter muffler of claim 4, wherein the respective inflow-side ends of the damping elements, in relation to the respective involute contours, have a rear curvature in the circumferential direction.

6. The filter muffler of claim 1, wherein the tapering runs toward an outflow edge of the diffuser element and leads at the outflow edge to a reduction in thickness of the damping element of at least 50%.

7. The filter muffler of claim 1, wherein the damping elements are configured such that a cross-section of an inflow region of the respective flow channels between adjacent damping elements becomes smaller in the direction of flow.

8. The filter muffler of claim 1, wherein the damping elements are configured such that a cross-section of the respective flow channels in a region which is delimited by involute contours of adjacent damping elements is constant in the direction of flow.

9. The filter muffler of claim 1, wherein the damping elements are configured such that a cross-section of an outflow region of the respective flow channels between adjacent damping elements becomes larger in the direction of flow.

10. The filter muffler of claim 1, wherein the flow channel is delimited by respective involute contours of adjacent damping elements over at least 50% of the flow channel length.

11. The filter muffler of claim 3, wherein a distance D between the respective involute contours of adjacent damping elements is selected from a range of 2 mm≤D≤30 mm.

12. The filter muffler of claim 1, wherein the respective damping elements have a first involute contour and a second involute contour parallel to the first involute contour, and wherein a distance T between the first involute contour and the second involute contour is selected from a range of 6 mm≤T≤50 mm.

13. The filter muffler of claim 1, wherein respective inflow-side ends of the damping elements have a rear curvature in the circumferential direction.

14. The filter muffler of claim 1, wherein the tapering runs toward an outflow edge of the diffuser element and leads at the outflow edge to a reduction in thickness of the damping element of at least 20%.

15. The filter muffler of claim 14, wherein the damping elements are configured such that a cross-section of an outflow region of the respective flow channels between adjacent damping elements becomes larger in the direction of flow.

16. The filter muffler of claim 6, wherein the damping elements are configured such that a cross-section of an outflow region of the respective flow channels between adjacent damping elements becomes larger in the direction of flow.

17. The filter muffler of claim 1, wherein the flow channel is delimited by respective involute contours of adjacent damping elements over at least 65% of the flow channel length.

18. The filter muffler of claim 3, wherein a distance D between the respective involute contours of adjacent damping elements is selected from a range of 5 mm≤D≤25 mm.

19. An exhaust gas turbocharger for an internal combustion engine, the gas turbocharger comprising:
a compressor having an intake side, and
a filter muffler arranged on the intake side of the compressor, the filter muffler comprising a front element, a rear element, and a plurality of damping elements arranged between the front element and the rear element, wherein the damping elements are arranged radially around a central axis of the filter muffler such that a flow channel is formed between adjacent damping elements, wherein respective outflow-side ends of the damping elements have a diffuser element which has an outflow-side tapering toward the central axis, wherein the outflow-side tapering is continuous and meets to form the outflow-side ends, and wherein an angle $\alpha$ between two opposite sides of the diffuser element is selected from a range of $1° \leq \alpha \leq 8°$.

20. An internal combustion engine comprising:
an exhaust gas turbocharger comprising:
a compressor having an intake side, and
a filter muffler arranged on the intake side of the compressor, the filter muffler comprising a front element, a rear element, and a plurality of damping elements arranged between the front element and the rear element, wherein the damping elements are arranged radially around a central axis of the filter muffler such that a flow channel is formed between adjacent damping elements, wherein respective outflow-side ends of the damping elements have a diffuser element which has an outflow-side tapering toward the central axis, wherein the outflow-side tapering is continuous and meets to form the outflow-side ends, and wherein an angle $\alpha$ between two opposite sides of the diffuser element is selected from a range of $1° \leq \alpha \leq 8°$.

\* \* \* \* \*